(12) United States Patent
Li et al.

(10) Patent No.: US 12,148,175 B2
(45) Date of Patent: Nov. 19, 2024

(54) MULTI-FRAME OPTICAL FLOW NETWORK WITH LOSSLESS PYRAMID MICRO-ARCHITECTURE

(71) Applicant: Samsung Electronics Co., Ltd., Suwon-si (KR)

(72) Inventors: Yingmao Li, Allen, TX (US); Chenchi Luo, Plano, TX (US); Gyeongmin Choe, San Jose, CA (US); John Seokjun Lee, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 17/590,998

(22) Filed: Feb. 2, 2022

(65) Prior Publication Data

US 2023/0245328 A1  Aug. 3, 2023

(51) Int. Cl.
*G06T 7/269* (2017.01)
(52) U.S. Cl.
CPC .... *G06T 7/269* (2017.01); *G06T 2207/10016* (2013.01); *G06T 2207/20081* (2013.01)
(58) Field of Classification Search
CPC ........... G06T 7/269; G06T 2207/10016; G06T 2207/20081; G06T 7/207; G06T 2207/20084
See application file for complete search history.

(56) References Cited

U.S. PATENT DOCUMENTS

| | | | |
|---|---|---|---|
| 9,977,998 B2 | 5/2018 | Wong et al. | |
| 10,839,543 B2 | 11/2020 | Cheng et al. | |
| 2014/0225902 A1 | 8/2014 | Zhu et al. | |
| 2018/0286055 A1 | 10/2018 | Lim et al. | |
| 2019/0289321 A1 | 9/2019 | Liu et al. | |
| 2019/0297326 A1* | 9/2019 | Reda | G06T 5/20 |

(Continued)

FOREIGN PATENT DOCUMENTS

| | | |
|---|---|---|
| CN | 110991350 A | 4/2020 |
| CN | 113160277 A | 7/2021 |

(Continued)

OTHER PUBLICATIONS

International Search Report and Written Opinion of the International Searching Authority dated May 11, 2023 in connection with International Patent Application No. PCT/KR2023/001468, 9 pages.

(Continued)

*Primary Examiner* — Wesley J Tucker
*Assistant Examiner* — Han Hoang

(57) ABSTRACT

A method includes obtaining a first optical flow vector representing motion between consecutive video frames during a previous time step. The method also includes generating a first predicted optical flow vector from the first optical flow vector using a trained prediction model, where the first predicted optical flow vector represents predicted motion during a current time step. The method further includes refining the first predicted optical flow vector using a trained update model to generate a second optical flow vector representing motion during the current time step. The trained update model uses the first predicted optical flow vector, a video frame of the previous time step, and a video frame of the current time step to generate the second optical flow vector.

20 Claims, 12 Drawing Sheets

(56) References Cited

U.S. PATENT DOCUMENTS

| | | |
|---|---|---|
| 2019/0304067 A1 | 10/2019 | Vogels et al. |
| 2020/0160065 A1 | 5/2020 | Weinzaepfel |
| 2020/0265597 A1 | 8/2020 | Ye et al. |
| 2021/0056998 A1 | 2/2021 | Somanath et al. |
| 2021/0182616 A1 | 6/2021 | Huang et al. |
| 2021/0279840 A1* | 9/2021 | Chi .......................... G06T 3/40 |
| 2022/0092795 A1* | 3/2022 | Liu ......................... G06T 7/269 |
| 2022/0108421 A1* | 4/2022 | Shacklett .............. G06T 3/4046 |

FOREIGN PATENT DOCUMENTS

| | | |
|---|---|---|
| KR | 10-1750094 B1 | 6/2017 |
| KR | 10-2281017 B1 | 7/2021 |

OTHER PUBLICATIONS

Dosovitskiy et al., "FlowNet: Learning Optical Flow with Convolutional Networks," 2015 IEEE International Conference on Computer Vision (ICCV), Dec. 2015, 10 pages.

* cited by examiner

MULTI-FRAME OPTICAL FLOW NETWORK WITH LOSSLESS PYRAMID MICRO-ARCHITECTURE

TECHNICAL FIELD

This disclosure relates generally to machine learning systems. More specifically, this disclosure relates to a multi-frame optical flow network with a lossless pyramid micro-architecture and a method for its use.

BACKGROUND

With recent developments in smartphone camera technology, one important smartphone camera function is video capture. With increasing demand to capture high-quality and interesting videos, slow motion video functions are gaining a lot of attention because they can capture very fast motion and moments in videos. Although research has suggested methods for accurate video/frame interpolation and output of slow motion videos, there are no available machine learning-based video interpolation methods that can be executed on smartphones or other mobile devices. Furthermore, most machine learning-based video interpolation methods do not provide handling of possible failure cases or provide artifact control, which makes it difficult for these slow motion methods to be commercialized.

Optical flow techniques can be used in many applications, including frame interpolation for slow motion video, three-dimensional (3D) reconstruction, image registration, and the like. Optical flow techniques estimate the motion for each pixel between two image frames. However, optical flow solutions suffer from a number of significant problems. One problem is that these solutions generate predictions with only current measurement information, without considering valuable information from previous measurements. This may result in an unstable or incorrect estimation that leads to outliers and flickering results. Another problem is that these solutions suffer quality loss on large motion and thin structure objects.

SUMMARY

This disclosure provides a multi-frame optical flow network with a lossless pyramid micro-architecture and a method for its use.

In a first embodiment, a method includes obtaining a first optical flow vector representing motion between consecutive video frames during a previous time step. The method also includes generating a first predicted optical flow vector from the first optical flow vector using a trained prediction model, where the first predicted optical flow vector represents predicted motion during a current time step. The method further includes refining the first predicted optical flow vector using a trained update model to generate a second optical flow vector representing motion during the current time step. The trained update model uses the first predicted optical flow vector, a video frame of the previous time step, and a video frame of the current time step to generate the second optical flow vector.

In a second embodiment, an electronic device includes at least one memory configured to store instructions. The electronic device also includes at least one processing device configured when executing the instructions to obtain a first optical flow vector representing motion between consecutive video frames during a previous time step. The at least one processing device is also configured when executing the instructions to generate a first predicted optical flow vector from the first optical flow vector using a trained prediction model, where the first predicted optical flow vector represents predicted motion during a current time step. The at least one processing device is further configured when executing the instructions to refine the first predicted optical flow vector using a trained update model to generate a second optical flow vector representing motion during the current time step. The trained update model is configured to use the first predicted optical flow vector, a video frame of the previous time step, and a video frame of the current time step to generate the second optical flow vector.

In a third embodiment, a non-transitory machine-readable medium contains instructions that when executed cause at least one processor of an electronic device to obtain a first optical flow vector representing motion between consecutive video frames during a previous time step. The medium also contains instructions that when executed cause the at least one processor to generate a first predicted optical flow vector from the first optical flow vector using a trained prediction model, where the first predicted optical flow vector represents predicted motion during a current time step. The medium further contains instructions that when executed cause the at least one processor to refine the first predicted optical flow vector using a trained update model to generate a second optical flow vector representing motion during the current time step. The trained update model is configured to use the first predicted optical flow vector, a video frame of the previous time step, and a video frame of the current time step to generate the second optical flow vector.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 11, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, slow motion video functions are gaining a lot of attention because they can capture very fast motion and moments in videos. Although research has suggested methods for accurate video/frame interpolation and output of slow motion videos, there are no available machine learning-based video interpolation methods that can be executed on smartphones or other mobile devices. Furthermore, most machine learning-based video interpolation methods do not provide handling of possible failure cases or provide artifact control, which makes it difficult for these slow motion methods to be commercialized.

Optical flow techniques can be used in many applications, including frame interpolation for slow motion video, three-dimensional (3D) reconstruction, image registration, and the like. Optical flow techniques estimate the motion for each pixel between two image frames. However, optical flow solutions suffer from a number of significant problems. One problem is that these solutions generate predictions with only current measurement information, without considering valuable information from previous measurements. This may result in an unstable or incorrect estimation that leads to outliers and flickering results. Another problem is that these solutions suffer quality loss on large motion and thin structure objects.

This disclosure provides a multi-frame optical flow network with a lossless pyramid micro-architecture and a method for its use. As described in more detail below, the disclosed network integrates temporal information by using previous time estimates and updates results using current time measurements. In this way, the network is able to predict a much more robust result in appearance of disturbance. Also, the disclosed network uses a lossless pyramid micro-architecture that gradually synthesizes optical flow and disparity without losing any information such that all details can be preserved and are able to be recovered. Note that while some of the embodiments discussed below are described in the context of use for consumer electronic devices, this is merely one example. It will be understood that the principles of this disclosure may be implemented in any number of other suitable contexts.

Figure 1:
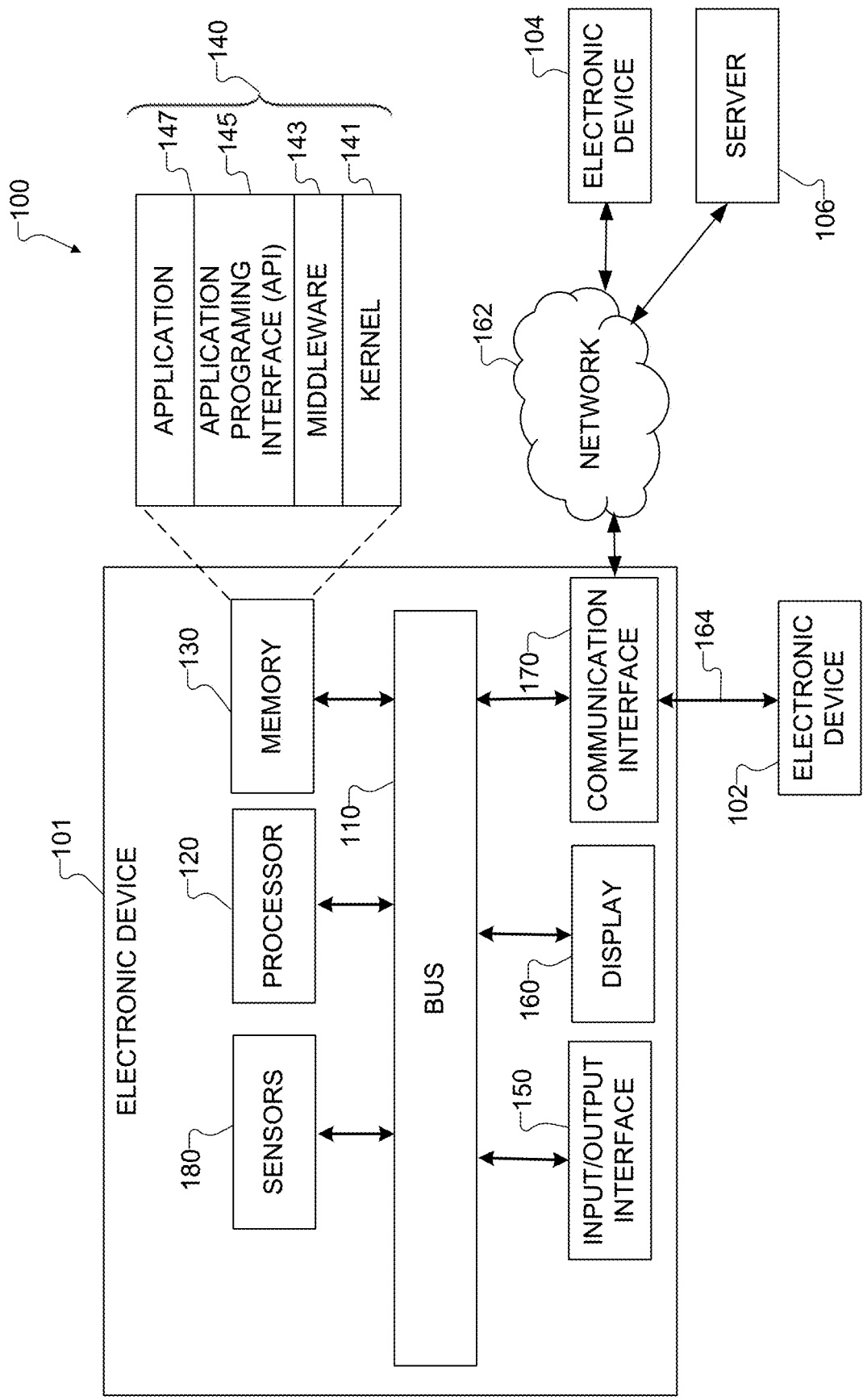
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations for implementing a multi-frame optical flow network with a lossless pyramid micro-architecture.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for implementing a multi-frame optical flow network with a lossless pyramid micro-architecture as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for implementing a multi-frame optical flow network with a lossless pyramid micro-architecture.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
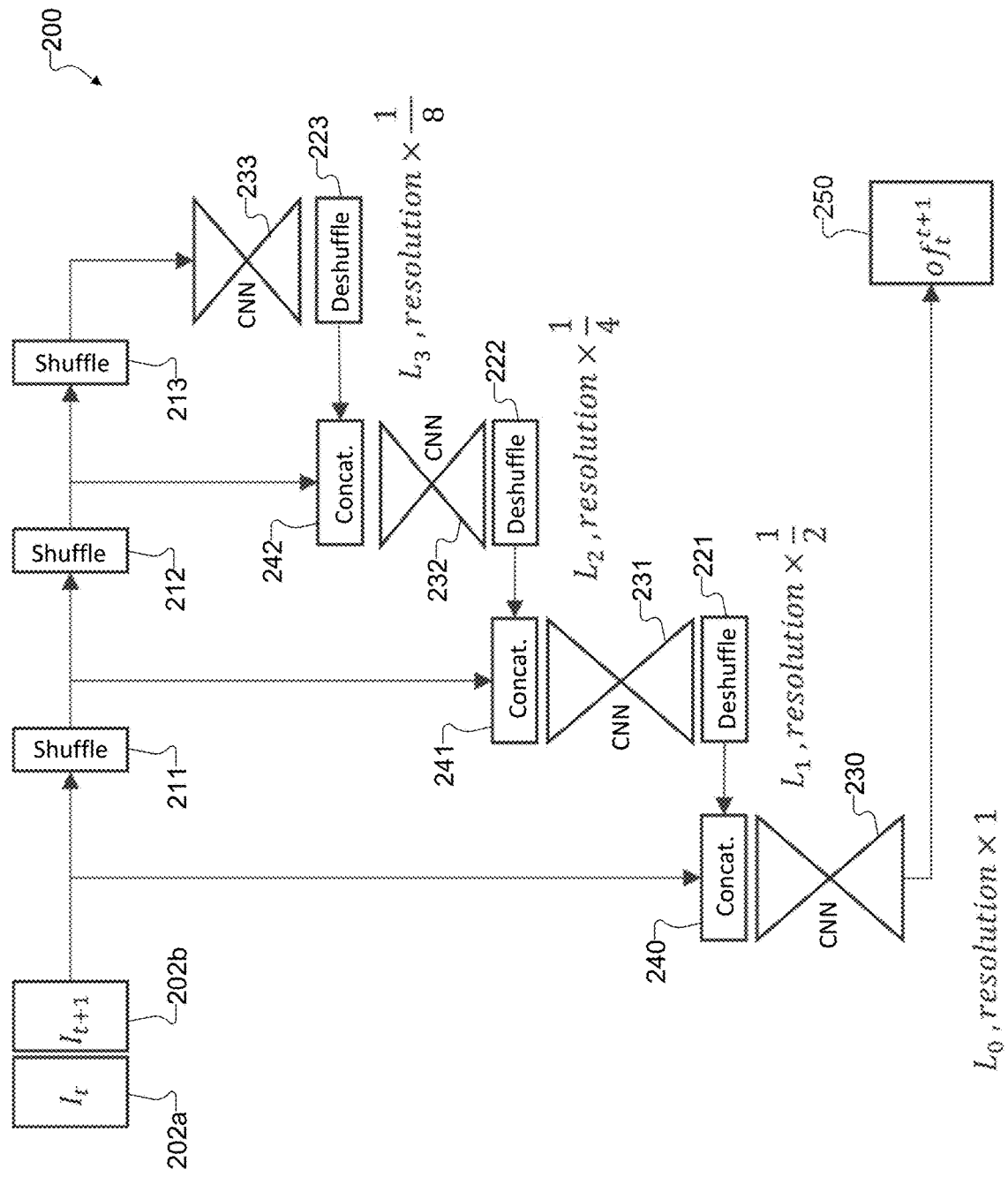
FIG. 2 illustrates an example network architecture for estimating optical flow according to this disclosure.

FIG. 2 illustrates an example network architecture 200 for estimating optical flow according to this disclosure. For ease of explanation, the network architecture 200 is described as being implemented using one or more components of the electronic device 101 described above. However, this is merely one example, and the network architecture 200 could be implemented using any other suitable device(s) and in any other suitable system(s), such as when implemented using the server 106.

As shown in FIG. 2, the electronic device 101 receives two images 202a-202b, which are identified as $I_t$ and $I_{t+1}$. The images 202a-202b are part of a sequence of consecutive video frames denoted $I_t, I_{t+1}, \ldots, I_{t+N-1}$ that form at least a portion of a video stream. In some embodiments, the video stream is captured at a specified frame rate (such as 30 frames per second), and a user may want to make a slow motion video out of the video stream. Using the network architecture 200, the electronic device 101 determines an optical flow vector 250 identified as $of_t^{t+1}$, which describes the motion of each pixel in between images $I_t$ and $I_{t+1}$, including both the angle of the motion and the magnitude of the motion.

The network architecture 200 includes a "pyramid" structure with multiple subnetworks $L_0, L_1, L_2, L_3$. Each subnetwork $L_0$-$L_3$ is a lossless downsampling layer that processes images at a particular resolution and a particular number of channels. As described in greater detail below, the first subnetwork $L_0$ processes images at the highest resolution and the smallest number of channels, and subsequent subnetworks have images at reduced resolutions but larger numbers of channels, thus creating a pyramid structure. Within the pyramid structure are multiple shuffle layers 211-213, deshuffle layers 221-223, neural networks 231-233, and concatenation operations 240-242.

Figure 3B:
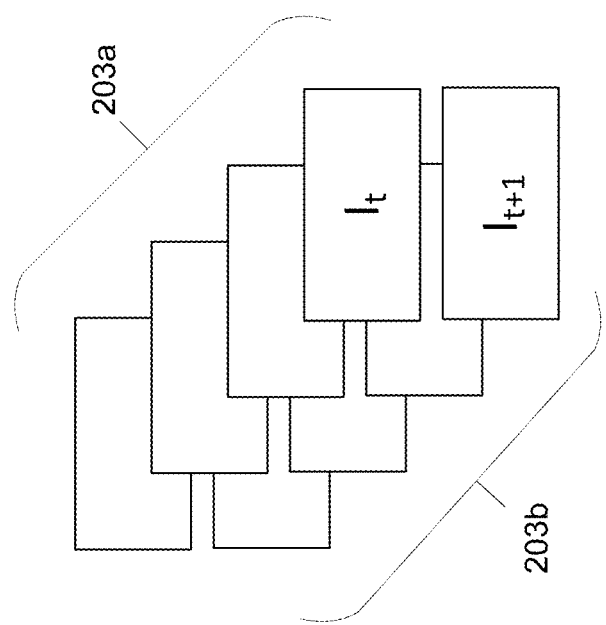
FIGS. 3A through 3D illustrate example images at multiple resolutions generated using the network architecture of FIG. 2 according to this disclosure.
Figure 3A:
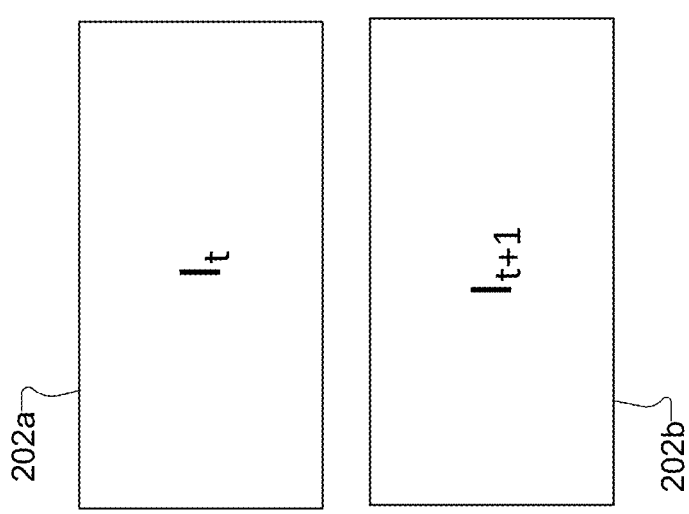
Figure 3D:
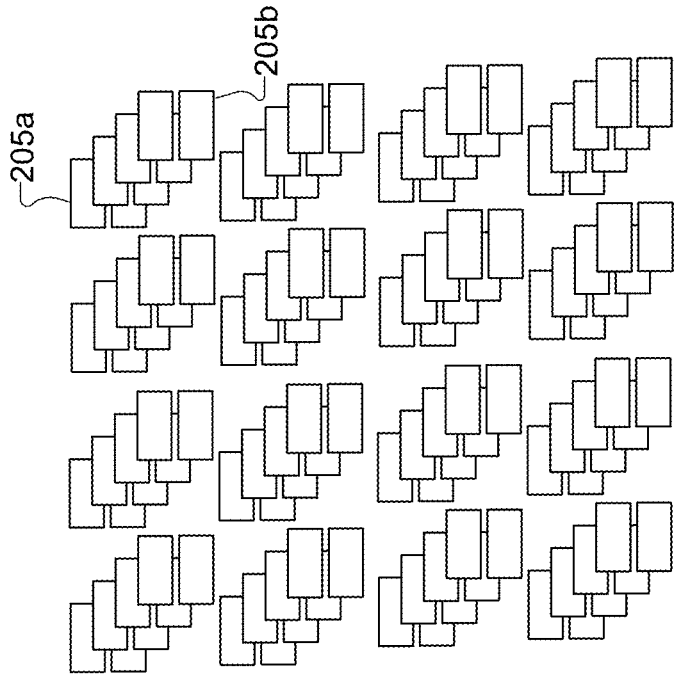
Figure 3C:
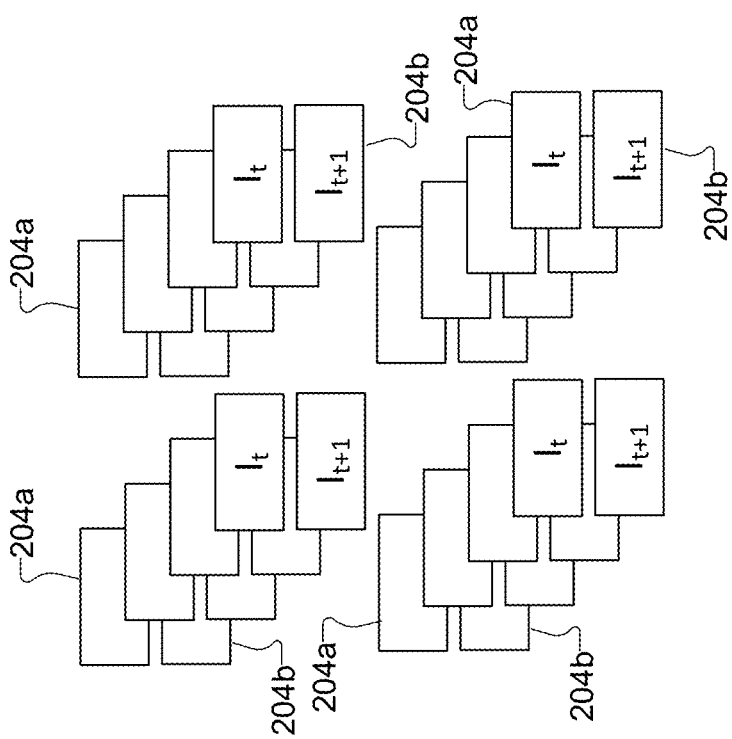

The shuffle layers 211-213 are used to generate a "pyramid" of additional images at decreasing resolutions, one example of which is shown in FIGS. 3A through 3D. Each shuffle layer 211-213 takes input frames with resolution h, w, and c and creates a new image with half the resolution and four times the number of channels $$\left(\frac{h}{2} \times \frac{w}{2} \times 4c\right)$$

compared with the input. For example, the first shuffle layer 211 receives the images 202a-202b at a first resolution (such as 400×600 pixels in one channel) (FIG. 3A) and generates images 203a-203b at a second resolution that is half of the first resolution (such as 200×300 pixels) and that have four channels each (such as four channels for the image 203a and four channels for the image 203b) (FIG. 3B). The second shuffle layer 212 receives the images 203a-203b and generates images 204a-204b at a third resolution that is half of the second resolution (such as 100×150 pixels) and that have sixteen channels each (FIG. 3C). The third shuffle layer 213 receives the images 204a-204b and generates images 205a-205b at a fourth resolution that is half of the third resolution (such as 50×75 pixels) and that have sixty-four channels each (FIG. 3D).

Figure 4:
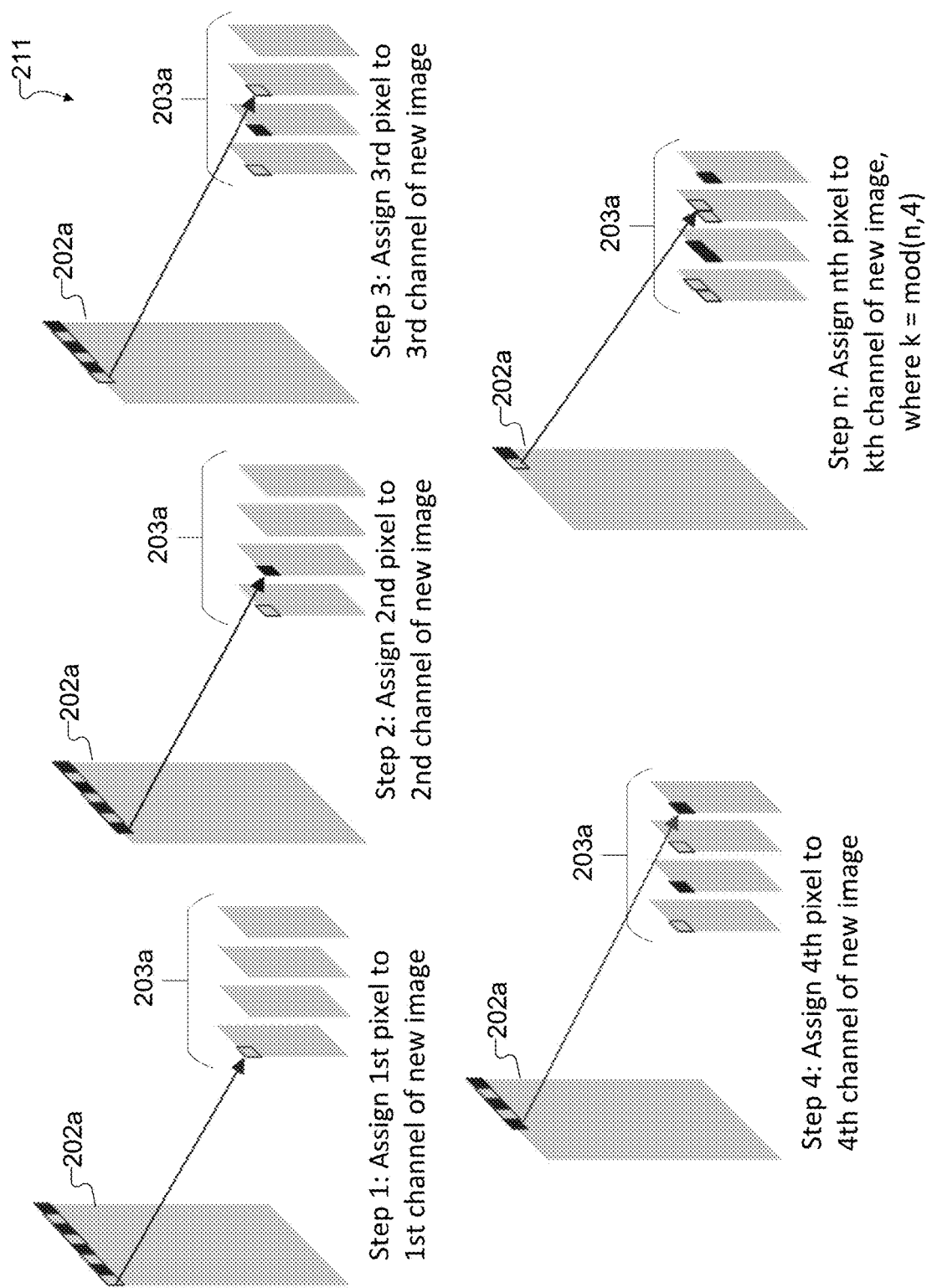
FIG. 4 illustrates further details of an example shuffle layer in the network architecture of FIG. 2 according to this disclosure.

Each shuffle layer 211-213 performs a pixel "shuffling" operation to generate the additional channels. FIG. 4 illustrates further details of an example shuffle layer 211. As shown in FIG. 4, in the shuffle layer 211, the electronic device 101 assigns each pixel of the image 202a to the four channels of the images 203a in a sequential manner (from left to right and from top to bottom) until all pixels are assigned, thereby "shuffling" the pixels of the image 202a across the four channels. In this way, the shuffle layer 211 produces four channels of the image 203a, each of which includes one-fourth of the pixels of the image 202a. The same process is performed in the shuffle layer 211 for generating the image 203b with four channels from the image 202b. It is noted that the shuffling operation is lossless, which means that all detail of each image is preserved. The shuffle layers 212-213 also include the same pixel shuffling operations as the shuffle layer 211 but start with more images at lower resolutions.

Figure 5:
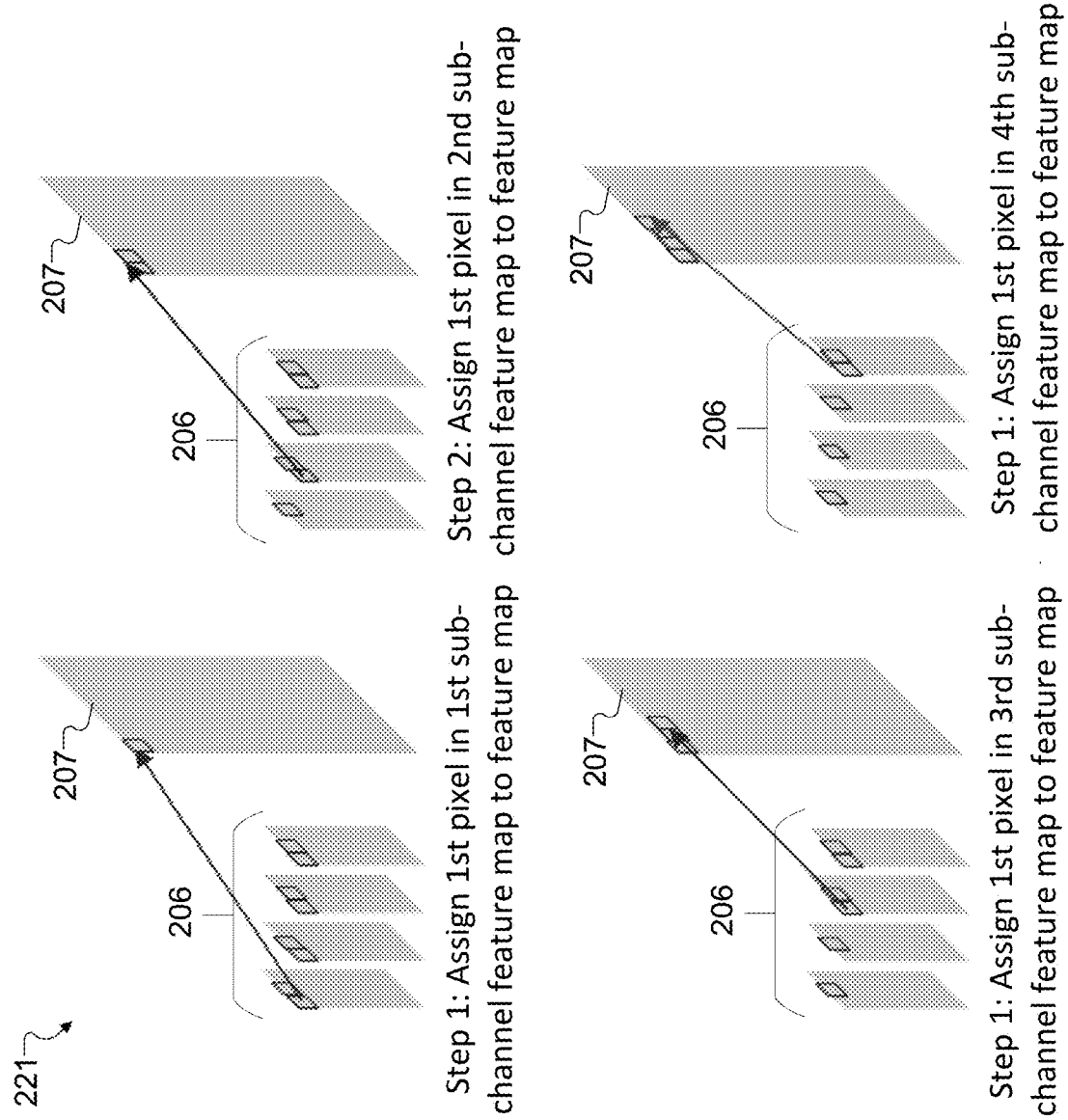
FIG. 5 illustrates further details of an example deshuffle layer in the network architecture of FIG. 2 according to this disclosure.

Returning to FIG. 2, it can be seen that each shuffle layer 211-213 has a corresponding deshuffle layer 221-223. Each deshuffle layer 221-223 is used to perform a reverse operation compared to its corresponding shuffle layer 211-213. That is, each deshuffle layer 221-223 converts an input with $$\frac{h}{2} \times \frac{w}{2} \times 4c$$

resolution to an output having h×w×c resolution. FIG. 5 illustrates further details of an example deshuffle layer 221. As shown in FIG. 5, in the deshuffle layer 221, the electronic device 101 assigns each pixel of four sub-channel feature maps 206 in a sequential manner to a feature map 207 having a higher resolution. For example, in the deshuffle layer 221, the resolution of the four sub-channel feature maps 206 can be 200×300, while the resolution of the feature map 207 can be 400×600. The deshuffle layer 221 can assign pixels in this manner until all pixels in the four sub-channel feature maps 206 are assigned to the feature map 207. The four sub-channel feature maps 206 received by the deshuffle layer 221 are generated using the neural network 231 as described in greater detail below. The deshuffle layers 222-223 also include the same pixel deshuffling operations as the deshuffle layer 221 but start with more sub-channel feature maps 206 at lower resolutions.

Returning to FIG. 2, after the electronic device 101 generates the images 203a-203b, 204a-204b, and 205a-

205$b$, the electronic device 101 uses the subnetworks $L_0$-$L_3$ to process the images and obtain the optical flow vector 250 (of$_t^{t+1}$). As shown in FIG. 2, the subnetworks $L_0$-$L_3$ are implemented sequentially in reverse order $L_3$ to $L_0$. The subnetwork $L_3$ takes the images 205$a$-205$b$, which are input to the neural network 233. The neural network 233 receives the images 205$a$-205$b$ and generates the multiple sub-channel feature maps 206 having the same number of channels (such as sixty-four channels) as the images 205$a$-205$b$. In some embodiments, the neural network 233 is a deep learning network having encoder and decoder layers, such as a convolutional neural network (CNN). However, any other suitable machine learning model may be used here. The neural network 233 represents any suitable deep learning network or other machine learning model that is trained to generate feature maps from images. After the neural network 233 generates the sub-channel feature maps 206, the electronic device 101 performs the deshuffle layer 223 to generate the feature map 207 as described above.

After generation of the feature map 207 in the subnetwork $L_3$, the electronic device 101 uses the subnetwork $L_2$ to combine the images 204$a$-204$b$ from the shuffle layer 212 with the feature map 207 from the deshuffle layer 223 using the concatenation operation 242. The resulting combination is input to the neural network 232, which is used to generate other sub-channel feature maps 206. In some embodiments, the neural network 232 is a deep learning network having encoder and decoder layers, such as a convolutional neural network (CNN). However, any other suitable machine learning model may be used here. The electronic device 101 continues in a reverse direction through the subnetworks $L_0$-$L_3$ such that, after use of the subnetwork $L_i$, the electronic device 101 concatenates the output of the subnetwork $L_i$ with an input at the subnetwork $L_{i-1}$ and continues with the subnetwork $L_{i-1}$. After using the subnetwork $L_0$, the electronic device 101 outputs the optical flow vector 250 (of$_t^{t+1}$) at a resolution of (h, w).

For ease of explanation, the network architecture 200 has been described as using four downsample layers $L_0$-$L_3$. However, this is merely one example, and the network architecture 200 can include n downsample layers, where n is an integer greater than one. In some embodiments, the number of downsample layers n can be determined empirically by using the following:

$$r_c * 2^n \geq f_m$$

where $f_m$ is the maximum desired optical flow magnitude, and $r_c$ is the receptive field of the neural networks 230-233.

As described above, the network architecture 200 allows the electronic device 101 to successively downscale images to lower resolutions, thus causing any large motion between the images 202$a$-202$b$ to become smaller. With smaller motion, the electronic device 101 can estimate optical flow more accurately, even when there is thin structure motion. Thin structures are objects with at least one small dimension relative to other objects in the frame, such as a person's arm that can appear thin (narrow) compared to other parts of the person shown in a frame. Of course, estimated small motions may not accurately and completely reflect the large motion. Thus, the network architecture 200 combines different optical flows with different resolutions and different levels of motion to achieve a more accurate overall estimate. The network architecture 200 is able to preserve image information using the multiple lossless downsample layers $L_0$-$L_3$.

Although FIGS. 2 through 5 illustrate one example of a network architecture 200 for estimating optical flow and related details, various changes may be made to FIGS. 2 through 5. For example, while the network architecture 200 is described with various examples of machine learning models and tasks, other embodiments could include other machine learning models and/or other tasks. Also, while shown as a specific sequence of operations, various operations shown in FIGS. 2 through 5 could overlap, occur in parallel, occur in a different order, or occur any number of times (including zero times). In addition, the specific operations shown in FIGS. 2 through 5 are examples only, and other techniques could be used to perform each of the operations shown in FIGS. 2 through 5.

Figure 6:
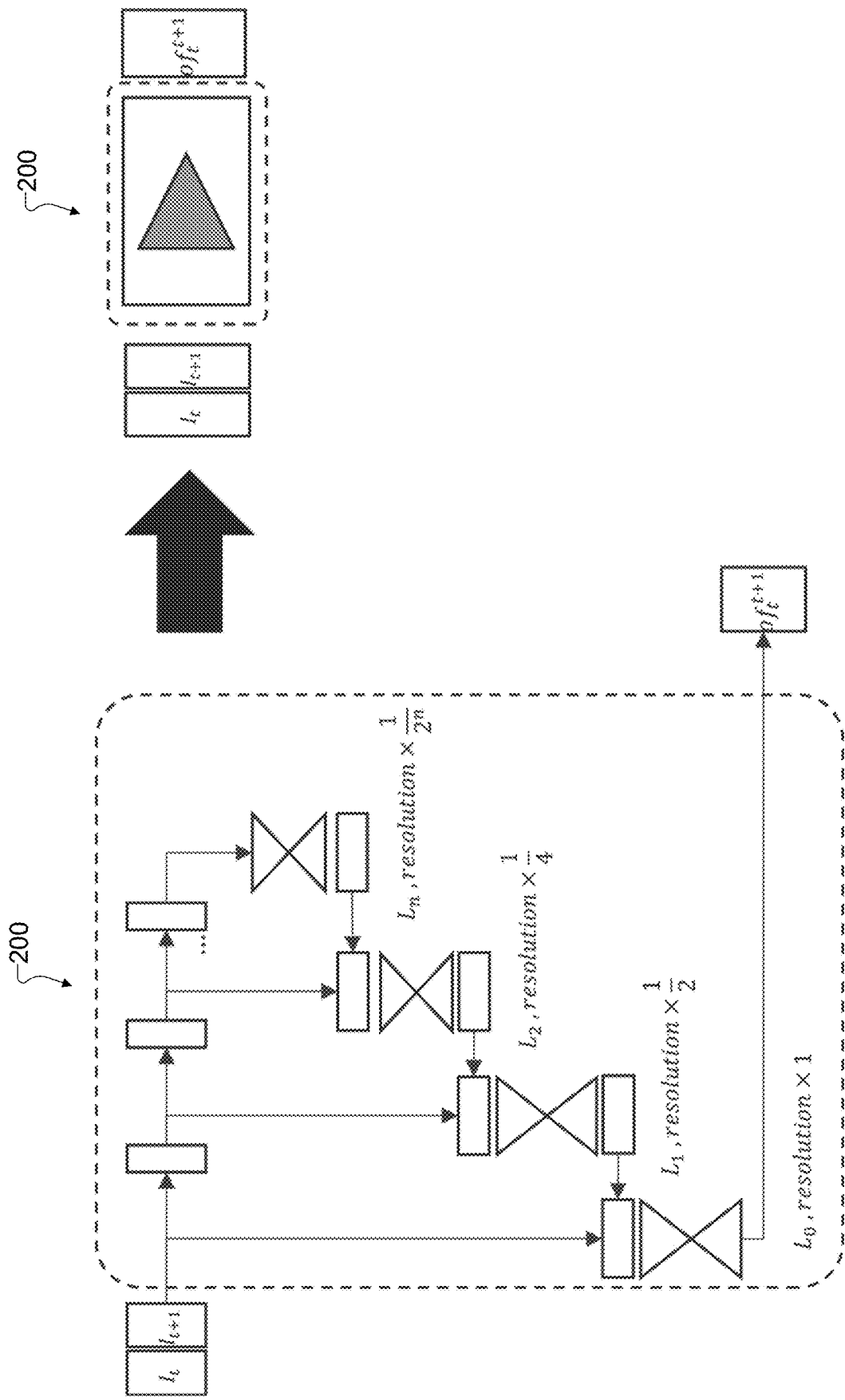
FIG. 6 illustrates an example change in notation for the network architecture of FIG. 2 according to this disclosure.

FIG. 6 illustrates an example change in notation for the network architecture 200 according to this disclosure. For ease of illustration, the network architecture 200 can also be represented by the symbol shown on the right side of FIG. 6. It will be understood that when this symbol is shown in other drawings, the network architecture 200 can still include any or all of the shuffle layers 211-213, deshuffle layers 221-223, neural networks 231-233, and concatenation operations 240-242 as shown in FIGS. 2 through 5. For example, the network architecture 200 can be implemented as part of a multi-frame optical flow pipeline as discussed in greater detail below. The symbol shown in FIG. 6 is helpful in differentiating the network architecture 200 from other components described in this disclosure.

Figure 7:
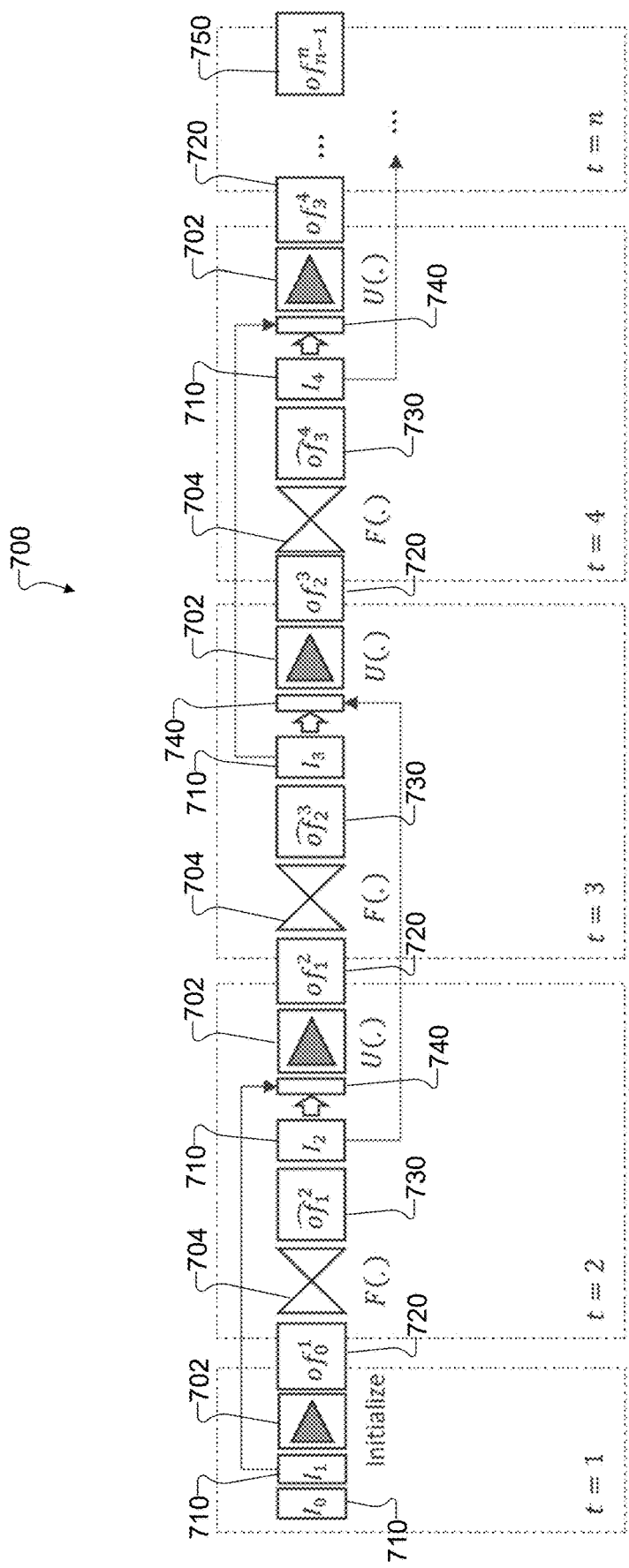
FIG. 7 illustrates an example multi-frame optical flow pipeline according to this disclosure.

FIG. 7 illustrates an example multi-frame optical flow pipeline 700 according to this disclosure. For ease of explanation, the optical flow pipeline 700 is described as being implemented using one or more components of the electronic device 101 described above. However, this is merely one example, and the optical flow pipeline 700 could be implemented using any other suitable device(s) and in any other suitable system(s), such as when implemented using the server 106.

As shown in FIG. 7, the optical flow pipeline 700 represents a frame interpolation pipeline that produces flicker-free results by using temporal information. The optical flow pipeline 700 incorporates two trained neural networks, namely an update model 702 and a prediction model 704, that are applied alternatingly (once at each time step t). Expressed in general terms, the optical flow pipeline 700 estimates optical flow at time t using an input video frame $I_t$ and a previous optical flow determined at time t−1. If there are any disturbances in the video frame $I_t$, the output of optical flow pipeline 700 is still robust because the previous time estimation result is used.

The electronic device 101 uses the prediction model 704 to calculate a predicted optical flow vector $\widehat{of}_{t-1}^{t}$ at each time t using the result from the previous time t−1. The prediction model 704 serves as a state transfer function F(•), which describes how the state evolves from time t−1 to time t. The prediction model 704 can be trained to learn the transfer function F(of$_{t-1}^{t}$) so that the prediction model 704 is able to generate the predicted optical flow vector $\widehat{of}_{t-1}^{t}$ based on the previous time optical flow estimate of$_{t-2}^{t-1}$. The prediction model 704 represents any suitable trained network or other machine learning model for predicting an optical flow. In some embodiments, the prediction model 704 is a deep learning network having encoder and decoder layers, such as a CNN. However, any other suitable machine learning model may be used here.

The electronic device 101 uses the update model 702 to refine the predicted result from the current measurements. In some embodiments, the update model 702 represents (or is represented by) the network architecture 200. The update model 702 (also identified as U(•) in FIG. 7) takes the predicted flow map $\widehat{of}_{t-1}^{\,t}$, which is the output of the prediction model 704, and the previous and current video frames $I_{t-1}$, $I_t$ as inputs and generates an updated optical flow vector $of_{t-1}^{\,t}$ as an output.

As shown in FIG. 7, the electronic device 101 initializes the optical flow pipeline 700 at time step t=1 using consecutive images 710 from the previous time step and the current time step ($I_0$, $I_1$). The electronic device 101 uses the update model 702 as an initialization network and generates an optical flow vector 720 (of) representing the motion from the image $I_0$ to the image $I_1$. During the initialization stage at time step t=1, the prediction model 704 is not used. After the initialization stage, the electronic device 101 alternately implements the update model 702 and the prediction model 704 for time steps t=2, 3, 4, . . . , n. For example, at time step t=2, the electronic device 101 inputs the optical flow vector 720 ($of_0^1$) to the prediction model 704 and uses the prediction model 704 to predict the predicted optical flow vector 730 ($\widehat{of}_1^{\,2}$). The predicted optical flow vector 730 ($\widehat{of}_1^{\,2}$) the image 710 from time step t=1 ($I_1$) and the image 710 from time step t=2 ($I_2$) are combined using a concatenation operation 740, and the combination is provided as an input to the update model 702. The electronic device 101 uses the update model 702 to refine the predicted optical flow vector 730 ($\widehat{of}_1^{\,2}$) from the current measurements and generates the updated optical flow vector 720 ($of_1^2$) as an output. This process is repeated for time steps t=3, 4, . . . , n until the electronic device 101 generates a final optical flow vector 750 ($of_{n-1}^{\,n}$).

Although FIG. 7 illustrate one example of a multi-frame optical flow pipeline 700, various changes may be made to FIG. 7. For example, while the multi-frame optical flow pipeline 700 is described with various examples of machine learning models and tasks, other embodiments could include other machine learning models and/or other tasks. Also, while shown as a specific sequence of operations, various operations shown in FIG. 7 could overlap, occur in parallel, occur in a different order, or occur any number of times (including zero times). In addition, the specific operations shown in FIG. 7 are examples only, and other techniques could be used to perform each of the operations shown in FIG. 7.

Figure 8:
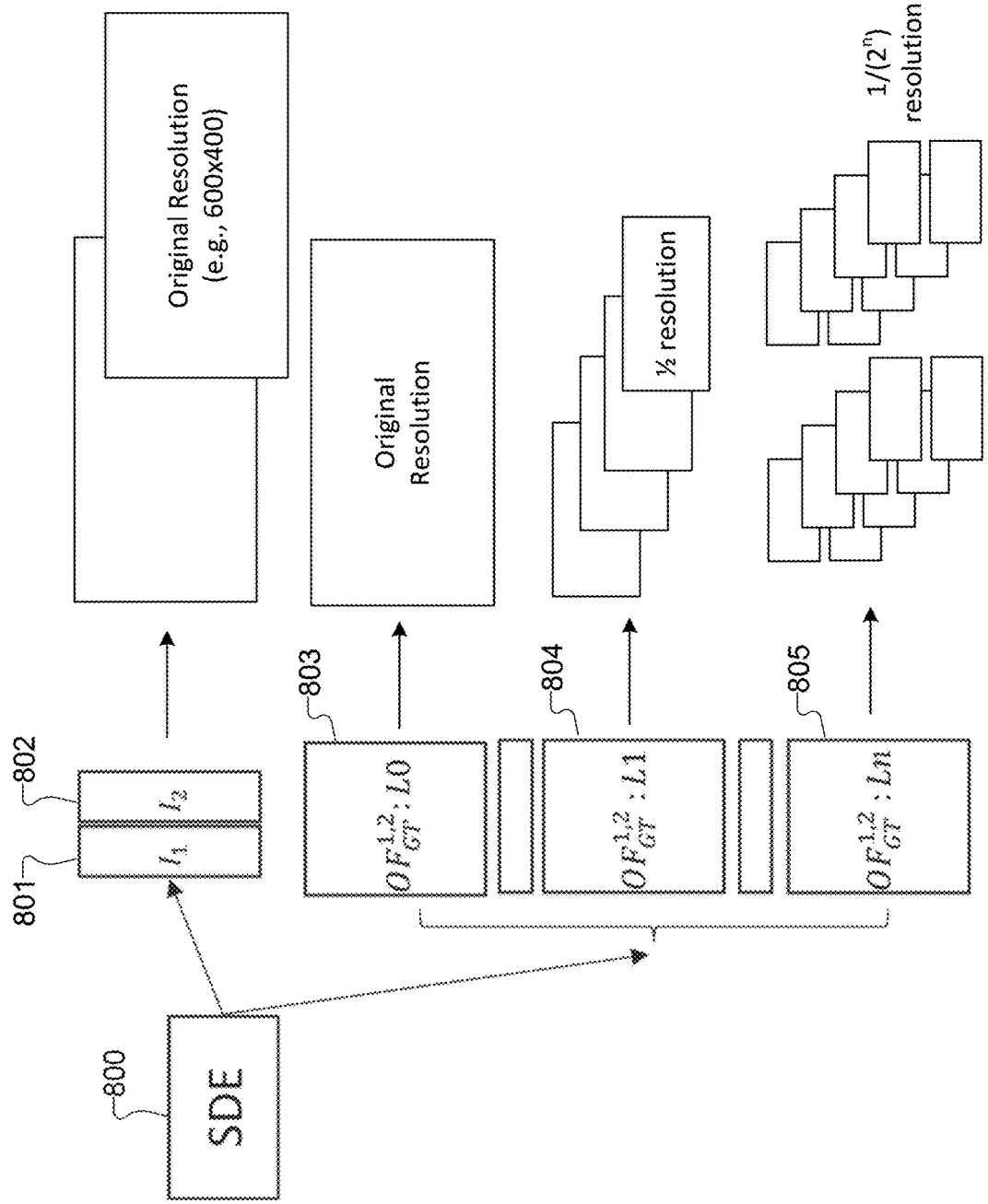
FIG. 8 illustrates an example synthetic training data engine according to this disclosure.

FIG. 8 illustrates an example synthetic training data engine 800 according to this disclosure. The synthetic training data engine 800 can be used for generating ground truth images and motion vectors at different resolutions. The ground truth images and the motion vectors can be used for training, such as for training one or more neural networks or other machine learning models in the network architecture 200 or the multi-frame optical flow pipeline 700. For ease of explanation, the synthetic training data engine 800 is described as being implemented using one or more components of the electronic device 101 described above. However, this is merely one example, and the synthetic training data engine 800 could be implemented using any other suitable device(s) and in any other suitable system(s), such as when implemented using the server 106.

As shown in FIG. 8, the synthetic training data engine 800 is configured to generate training data at different resolutions. The training data generated by the synthetic training data engine 800 can include both training images 801-802 and ground truth optical flow vectors 803-805. In some embodiments, the synthetic training data engine 800 includes a gaming engine, such as the UNREAL engine by EPIC GAMES, INC., that is used to generate the training images 801-802 and the ground truth optical flow vectors 803-805. In some embodiments, the gaming engine includes a library of 3D human models, background object models, captured motion information, and other structures from which the training images 801-802 and the ground truth optical flow vectors 803-805 can be generated. As a particular example, while one or more animations are playing, the gaming engine can save 2D motion maps along with corresponding RGB color images or other images as the training images 801-802 and the ground truth optical flow vectors 803-805.

The training images 801-802 represent video frames or other still images similar to those that could be captured using a camera. In some embodiments, the training images 801-802 represent consecutive video frames in a sequence of video frames. For example, the training images 801-802 can be similar to the images 202a-202b shown in FIG. 2. In some embodiments, the training images 801-802 are generated at a particular "original" resolution (such as 600×400 pixels) that corresponds to an image resolution that can be used by a trained network, such as the update model 702 or the prediction model 704 of FIG. 7. The ground truth optical flow vectors 803-805 represent optical flows that correspond to the training images 801-802. In particular, the ground truth optical flow vectors 803-805 represent motion between the training images 801-802. Thus, the ground truth optical flow vectors 803-805 can be similar to the optical flow vector 250 shown in FIG. 2.

The synthetic training data engine 800 generates each of the ground truth optical flow vectors 803-805 at a different scale or resolution. For example, the ground truth optical flow vector 803 is at the original resolution, the ground truth optical flow vector 804 is at a half resolution, and the ground truth optical flow vector 805 is at a $\frac{1}{2}^n$ resolution. The ground truth optical flow vectors 804-805 that are at lower resolutions preserve all information and details found in the original resolution ground truth optical flow vector 803. In this way, any network or other machine learning model that is trained using the ground truth optical flow vectors 803-805 will be able to preserve thin structures with large motion.

Each of the resolutions can correspond to a different subnetwork level, such as the subnetworks $L_0$-$L_3$ of FIG. 2. For example, the ground truth optical flow vector 803 may correspond to the $L_0$ level, the ground truth optical flow vector 804 may correspond to the $L_1$ level, and the ground truth optical flow vector 805 may correspond to the In level. During machine learning model training processes, any and all levels of the ground truth optical flow vectors 803-805 can be used. The number of levels used can depend on the size of details to be preserved during training. That is, the more detail that is desired, the greater the number of levels that may be used.

While FIG. 8 shows two training images 801-802 at a particular resolution and three ground truth optical flow vectors 803-805 that correspond to the two training images 801-802, this is merely one example. The synthetic training data engine 800 can generate other quantities of training images and ground truth optical flow vectors at other resolutions. In general, the synthetic training data engine 800 can generate a sequence of images $I_1, I_2, I_3 \ldots, I_t$. The synthetic training data engine 800 can also generate ground truth optical flow vectors at different levels and that correspond to the sequence of images, which in some cases may be given by the following:

$$of_{gt}^{12} = [of_{1,2}^{gt}:L_0, of_{1,2}^{gt}:L_1 \ldots of_{1,2}^{gt}:L_n]$$

$$of_{gt}^{23} = [of_{2,3}^{gt}:L_0, of_{2,3}^{gt}:L_1 \ldots of_{2,3}^{gt}:L_n]$$

$$of_{gt}^{t-1,t} = [of_{t-1,t}^{gt}:L_0, of_{t-1,t}^{gt}:L_1 \ldots of_{t-1,t}^{gt}:L_n]$$

Although FIG. 8 illustrate one example of a synthetic training data engine 800, various changes may be made to FIG. 8. For example, while the synthetic training data engine 800 is described as using a gaming engine, other embodiments could include other types of engines or techniques for generating training data. Also, the specific generated training data shown in FIG. 8 are examples only, and other training data could be generated using the synthetic training data engine 800 shown in FIG. 8. In addition, any suitable training data may be obtained in any other suitable manner.

Figure 9:
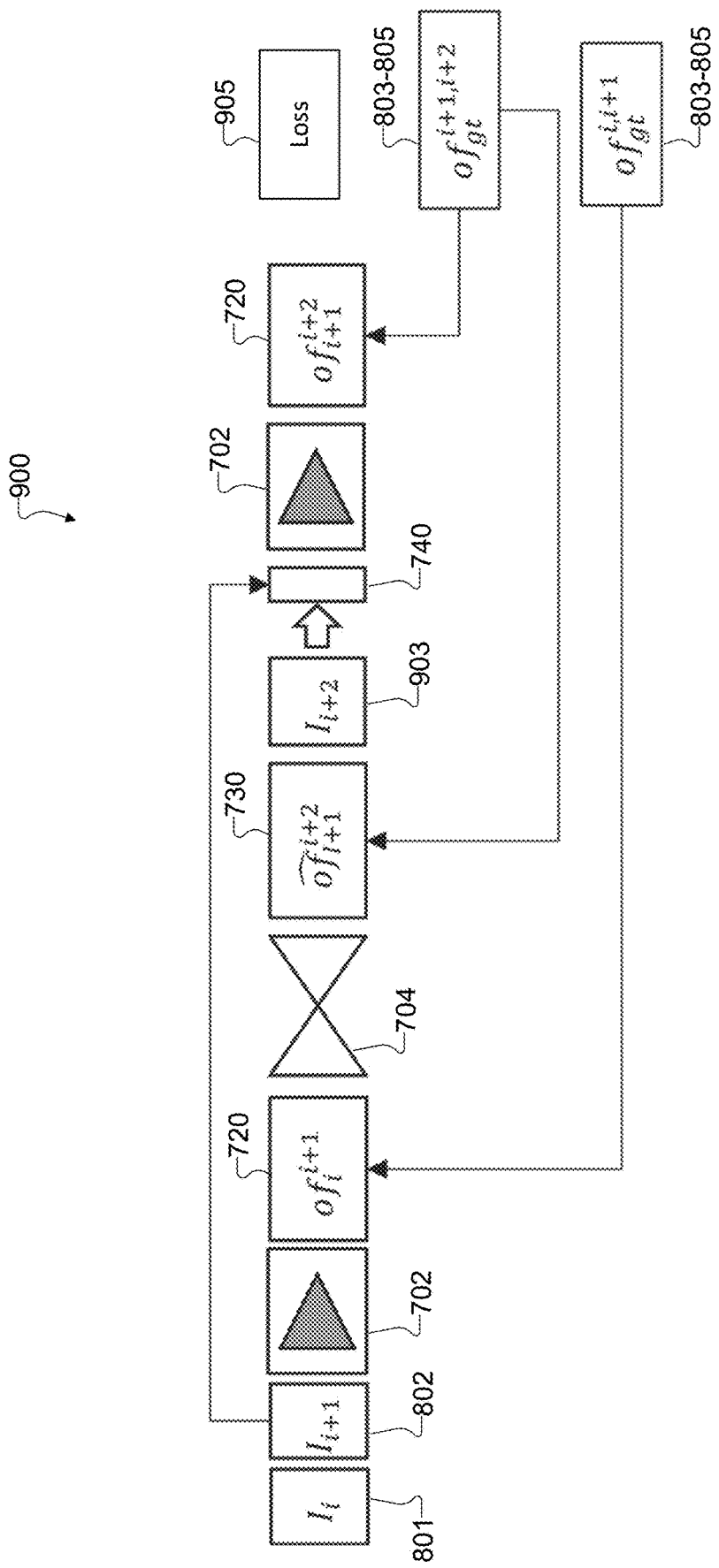
FIG. 9 illustrate an example training process for training one or more neural networks or other machine learning models according to this disclosure.

FIG. 9 illustrate an example training process 900 for training one or more neural networks or other machine learning models according to this disclosure. For ease of explanation, the training process 900 is described as being implemented using one or more components of the electronic device 101 described above. However, this is merely one example, and the training process 900 could be implemented using any other suitable device(s) and in any other suitable system(s), such as when implemented using the server 106.

As shown in FIG. 9, the electronic device 101 performs the training process 900 to train all or portions of the multi-frame optical flow pipeline 700 of FIG. 7. During the training process 900, the electronic device 101 uses training data, such as training data generated by the synthetic training data engine 800. As a particular example, the training data may include the training images 801-802 and the ground truth optical flow vectors 803-805. In some cases, the electronic device 101 uses the training images 801-802 as a sequence of video frames that are input to the multi-frame optical flow pipeline 700.

Initially, the electronic device 101 inputs the training images 801-802 to the update model 702, which generates an optical flow vector 720 ($of_i^{i+1}$) representing the motion from the image $I_i$ to the image $I_{i+1}$. The electronic device 101 inputs the optical flow vector 720 ($of_i^{i+1}$) to the prediction model 704 and uses the prediction model 704 to predict the predicted optical flow vector 730 ($\widehat{of}_{i+1}^{i+2}$). The predicted optical flow vector 730 ($\widehat{of}_{i+1}^{i+2}$), the training image 802 ($I_{i+1}$), and another training image 903 from the next time step ($I_{i+2}$) are combined using a concatenation operation 740, and the combination is provided as an input to the update model 702. The electronic device 101 uses the update model 702 to refine the predicted optical flow vector 730 ($\widehat{of}_{i+1}^{i+2}$) from the current measurements and generates the updated optical flow vector 720 ($of_{i+1}^{i+2}$) as an output.

The optical flow vectors 720 and the predicted optical flow vectors 730 generated during the training process 900 represent predictions of the ground truth optical flow vectors 803-805. However, prediction may not be entirely accurate, especially early in training. Thus, the training process 900 is performed iteratively, and one or more losses 905 can be calculated for each iteration. Each loss 905 is calculated to represent the difference between one or more ground truth optical flow vectors 803-805 and the corresponding one or more optical flow vectors 720 or predicted optical flow vectors 730. The electronic device 101 may calculate the loss 905 using any suitable metric for image quality, such as an expected prediction error (EPE) function or the like. One example of an EPE loss function is given below:

$$loss = |of_i^{i+1} - of_{gt}^{i,i+1}|_1 + |\widehat{of}_{i+1}^{i+2} - of_{gt}^{i+1,i+2}|_1 + |of_{i+1}^{i+2} - of_{gt}^{i+1,i+2}|_1$$

where i is an index (0≤i≤n) representing a time step in the sequence of n video frames. Of course, this is merely one example, and other loss function calculations can be used.

Once the loss 905 is calculated, the electronic device 101 uses the loss 905 to tune one or more machine learning model weights or other parameters. For example, in the training process 900, both the update model 702 and the prediction model 704 may include weights that are updated based on the calculated loss 905, such as via a backpropagation algorithm. Once the machine learning model weights or other parameters are updated, the electronic device 101 can perform another iteration of the training process 900, and the iterations can continue until the loss 905 is acceptably small or until one or more other criteria are met (such as a specified amount of time elapsing or a specified number of training iterations completing).

As discussed above, in some cases, the training data for the training process 900 can be generated by the synthetic training data engine 800 and can include image sequences $I_0$, $I_1$, . . . , $I_{n+1}$ and ground truth synthesized optical flow vectors $of_{gt}^{0,1}$, $of_{gt}^{1,2}$ . . . $of_{gt}^{n,n+1}$, which can be generated at multiple resolutions as described in FIG. 8. Because the training data includes different resolutions, the training process 900 can minimize the loss from each level of convolution using this multi-resolution training dataset. The ground truth synthesized optical flow vectors preserve all information, even in the lowest resolution. Thus, during the training process 900, the update model 702 and the prediction model 704 can be trained to have an optimal result on each level with different resolution. This represents an advantage over conventional training processes in which an "encoder-decoder" block performs a simple down-sample operation on an input image to generate a feature map, and most of the information is discarded after each down-sample. No matter how good the ground truth is, such conventional networks may never be able to learn important details.

Although FIG. 9 illustrates one example of a training process 900, various changes may be made to FIG. 9. For example, while the training process 900 is described with various examples of machine learning models and tasks, other embodiments could include other machine learning models and/or other tasks. Also, while shown as a specific sequence of operations, various operations shown in FIG. 9 could overlap, occur in parallel, occur in a different order, or occur any number of times (including zero times). In addition, the specific operations shown in FIG. 9 are examples only, and other techniques could be used to perform each of the operations shown in FIG. 9.

Note that the operations and functions shown in FIGS. 2 through 9 can be implemented in an electronic device 101, server 106, or other device in any suitable manner. For example, in some embodiments, the operations and functions shown in FIGS. 2 through 9 can be implemented or supported using one or more software applications or other software instructions that are executed by the processor 120 of the electronic device 101, server 106, or other device. In other embodiments, at least some of the operations and functions shown in FIGS. 2 through 9 can be implemented or supported using dedicated hardware components. In general, the operations and functions shown in FIGS. 2 through 9 can be performed using any suitable hardware or any suitable combination of hardware and software/firmware instructions.

Figure 10A:
FIGS. 10A and 10B illustrate examples of benefits that can be realized using one or more of the embodiments of this disclosure.
Figure 10B:

FIGS. 10A and 10B illustrate examples of benefits that can be realized using one or more of the embodiments of this disclosure. FIG. 10A depicts a video frame 1001 of a daytime scene generated using a conventional optical flow process, while FIG. 10B depicts a video frame 1002 of the same daytime scene generated using one of the embodiments disclosed above. In FIG. 10A, the video frame 1001 was captured and processed using a conventional optical flow process. As evident by FIG. 10A, the video frame 1001 exhibits poor motion results around the subject's arms, which are thin structures with large motion. In contrast, the video frame 1002 in FIG. 10B was captured and processed using the multi-frame optical flow pipeline 700 as described above. The resulting video frame 1002 provides motion results around the subject's arms that are significantly improved compared to the video frame 1001.

Although FIGS. 10A and 10B illustrate examples of benefits that can be realized using one or more of the embodiments of this disclosure, various changes may be made to FIGS. 10A and 10B. For example, images and videos can be captured of numerous scenes under different lighting conditions and from different distances and angles, and these figures do not limit the scope of this disclosure. These figures are merely meant to illustrate one example of the types of benefits that might be obtainable using the techniques described above.

Figure 11:
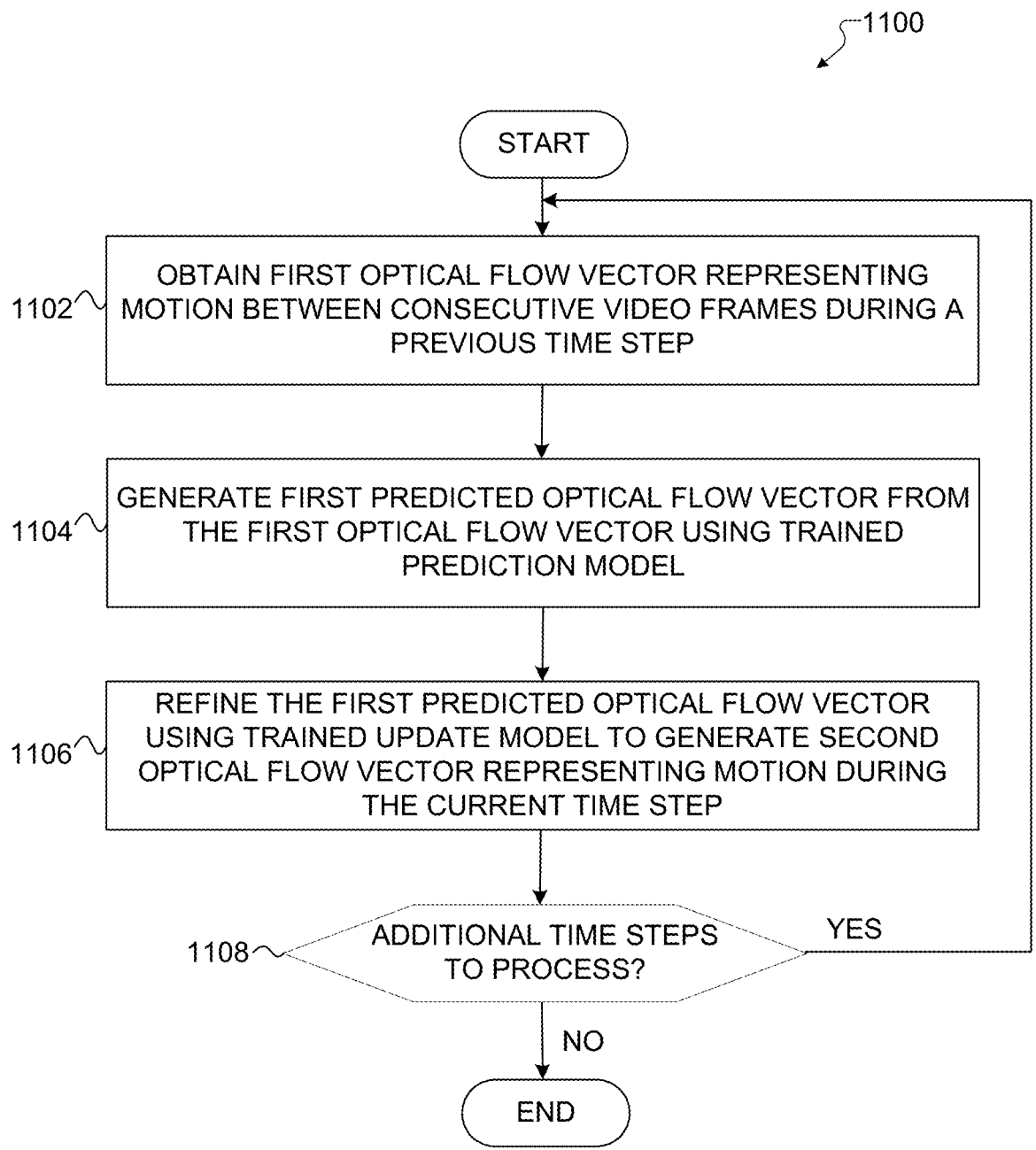
FIG. 11 illustrates an example method for video interpolation according to this disclosure.

FIG. 11 illustrates an example method 1100 for video interpolation according to this disclosure. For ease of explanation, the method 1100 shown in FIG. 11 is described as involving the use of the electronic device 101 shown in FIG. 1 and the multi-frame optical flow pipeline 700 shown in FIG. 7. However, the method 1100 shown in FIG. 11 could be used with any other suitable electronic device (such as the server 106) and any suitable process.

As shown in FIG. 11, a first optical flow vector representing motion between consecutive video frames during a previous time step of a video sequence is obtained at step 1102. This could include, for example, the electronic device 101 obtaining a first optical flow vector 720 representing motion between consecutive video frames 710 during a previous time step. A first predicted optical flow vector is generated from the first optical flow vector using a trained prediction model at step 1104. This could include, for example, the electronic device 101 generating a first predicted optical flow vector 730 from the first optical flow vector 720 using the trained prediction model 704. The first predicted optical flow vector represents predicted motion during a current time step.

The first predicted optical flow vector is refined using a trained update model to generate a second optical flow vector representing motion during the current time step at step 1106. This could include, for example, the electronic device 101 refining the first predicted optical flow vector 730 using the trained update model 702 to generate a second optical flow vector 720 representing motion during the current time step. The trained update model 702 uses the first predicted optical flow vector, a video frame of the previous time step, and a video frame of the current time step to generate the second optical flow vector. It is determined if there are additional time steps to be processed in the video sequence at step 1108. If so, the method 1100 returns to step 1102. Otherwise, the method 1100 ends.

Although FIG. 11 illustrates one example of a method 1100 for video interpolation, various changes may be made to FIG. 11. For example, while shown as a series of steps, various steps in FIG. 11 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining a first optical flow vector representing motion between consecutive video frames during a previous time step;
generating a first predicted optical flow vector from the first optical flow vector using a trained prediction model, the first predicted optical flow vector representing predicted motion during a current time step; and
refining the first predicted optical flow vector using a trained update model to generate a second optical flow vector representing motion during the current time step, wherein the trained update model uses the first predicted optical flow vector, a video frame of the previous time step, and a video frame of the current time step to generate the second optical flow vector;
wherein the trained update model comprises:
multiple shuffle layers configured to (i) receive the video frame of the previous time step and the video frame of the current time step and (ii) generate a lossless pyramid of additional images at decreasing resolutions and increasing numbers of channels; and
multiple subnetworks configured to be performed sequentially, each of the multiple subnetworks configured to receive a portion of the additional images at a different one of the decreasing resolutions.

2. The method of claim 1, further comprising:
repeating the obtaining, generating, and refining for one or more subsequent time steps after the current time step.

3. The method of claim 1, wherein an output of a final subnetwork to be performed among the multiple subnetworks represents the second optical flow vector.

4. The method of claim 3, wherein each of the multiple subnetworks other than the final subnetwork comprises a deshuffle layer configured to convert multiple sub-channel feature maps at a first resolution to a feature map having a second resolution twice the first resolution.

5. The method of claim 3, wherein each of the multiple subnetworks other than a first subnetwork to be performed comprises a concatenation layer configured to concatenate an output from a previously-performed subnetwork with an output from one of the multiple shuffle layers.

6. The method of claim 1, wherein the trained prediction model and the trained update model are trained using synthetic ground truth images and motion vectors at different resolutions.

7. The method of claim 6, further comprising:
generating the synthetic ground truth images and motion vectors using a synthetic training data engine that includes a gaming engine.

8. An electronic device comprising:
at least one memory configured to store instructions; and
at least one processing device configured when executing the instructions to:
obtain a first optical flow vector representing motion between consecutive video frames during a previous time step;
generate a first predicted optical flow vector from the first optical flow vector using a trained prediction model, the first predicted optical flow vector representing predicted motion during a current time step; and refine the first predicted optical flow vector using a trained update model to generate a second optical flow vector representing motion during the current time step, wherein the trained update model is configured to use the first predicted optical flow vector, a video frame of the previous time step, and a video frame of the current time step to generate the second optical flow vector;

wherein the trained update model comprises:
multiple shuffle layers configured to (i) receive the video frame of the previous time step and the video frame of the current time step and (ii) generate a lossless pyramid of additional images at decreasing resolutions and increasing numbers of channels; and
multiple subnetworks configured to be performed sequentially, each of the multiple subnetworks configured to receive a portion of the additional images at a different one of the decreasing resolutions.

9. The electronic device of claim 8, wherein the at least one processing device is further configured when executing the instructions to repeat the obtain, generate, and refine operations for one or more subsequent time steps after the current time step.

10. The electronic device of claim 8, wherein an output of a final subnetwork to be performed among the multiple subnetworks represents the second optical flow vector.

11. The electronic device of claim 10, wherein each of the multiple subnetworks other than the final subnetwork comprises a deshuffle layer configured to convert multiple sub-channel feature maps at a first resolution to a feature map having a second resolution twice the first resolution.

12. The electronic device of claim 10, wherein each of the multiple subnetworks other than a first subnetwork to be performed comprises a concatenation layer configured to concatenate an output from a previously-performed subnetwork with an output from one of the multiple shuffle layers.

13. The electronic device of claim 8, wherein the trained prediction model and the trained update model are trained using synthetic ground truth images and motion vectors at different resolutions.

14. The electronic device of claim 13, wherein the at least one processing device is further configured when executing the instructions to generate the synthetic ground truth images and motion vectors using a synthetic training data engine that includes a gaming engine.

15. A non-transitory machine-readable medium containing instructions that when executed cause at least one processor of an electronic device to:

obtain a first optical flow vector representing motion between consecutive video frames during a previous time step;

generate a first predicted optical flow vector from the first optical flow vector using a trained prediction model, the first predicted optical flow vector representing predicted motion during a current time step; and refine the first predicted optical flow vector using a trained update model to generate a second optical flow vector representing motion during the current time step, wherein the trained update model is configured to use the first predicted optical flow vector, a video frame of the previous time step, and a video frame of the current time step to generate the second optical flow vector;

wherein the trained update model comprises:
multiple shuffle layers configured to (i) receive the video frame of the previous time step and the video frame of the current time step and (ii) generate a lossless pyramid of additional images at decreasing resolutions and increasing numbers of channels; and
multiple subnetworks configured to be performed sequentially, each of the multiple subnetworks configured to receive a portion of the additional images at a different one of the decreasing resolutions.

16. The non-transitory machine-readable medium of claim 15, further containing instructions that when executed cause the at least one processor to repeat the obtain, generate, and refine operations for one or more subsequent time steps after the current time step.

17. The non-transitory machine-readable medium of claim 15, wherein an output of a final subnetwork to be performed among the multiple subnetworks represents the second optical flow vector.

18. The non-transitory machine-readable medium of claim 17, wherein each of the multiple subnetworks other than the final subnetwork comprises a deshuffle layer configured to convert multiple sub-channel feature maps at a first resolution to a feature map having a second resolution twice the first resolution.

19. The non-transitory machine-readable medium of claim 17, wherein each of the multiple subnetworks other than a first subnetwork to be performed comprises a concatenation layer configured to concatenate an output from a previously-performed subnetwork with an output from one of the multiple shuffle layers.

20. The non-transitory machine-readable medium of claim 15, wherein the trained prediction model and the trained update model are trained using synthetic ground truth images and motion vectors at different resolutions.

* * * * *